May 29, 1962     R. L. JACKSON, JR     3,036,946
DECORATIVE FILAMENTOUS MAT AND METHOD OF MAKING SAME
Filed Nov. 13, 1956     2 Sheets-Sheet 1
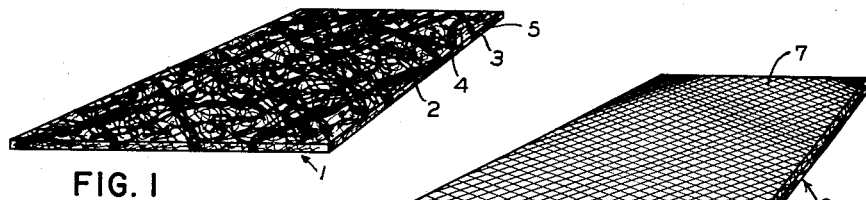
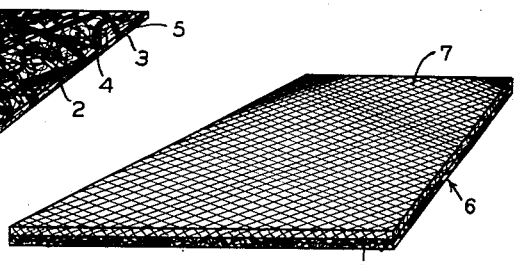
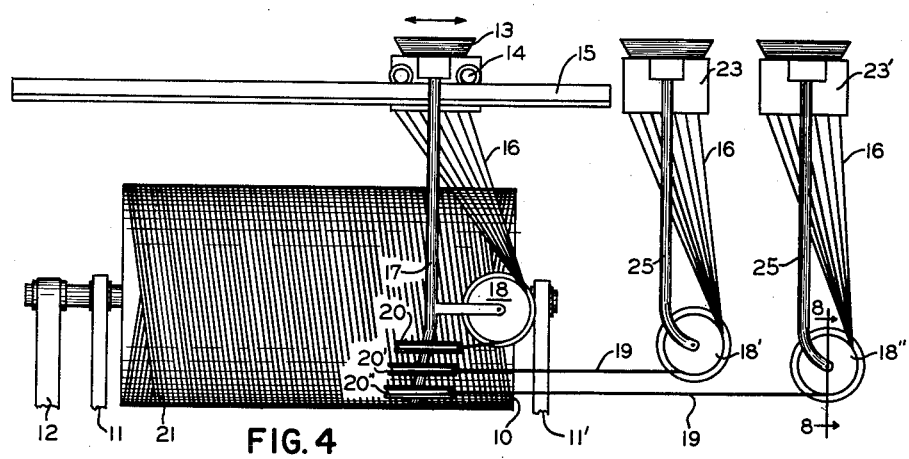
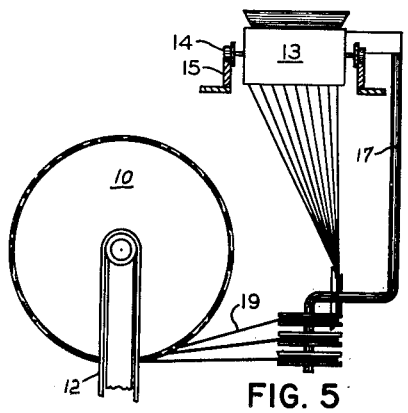
INVENTOR.
ROBERT L. JACKSON JR.
BY
ATTORNEY May 29, 1962 R. L. JACKSON, JR 3,036,946
DECORATIVE FILAMENTOUS MAT AND METHOD OF MAKING SAME
Filed Nov. 13, 1956 2 Sheets-Sheet 2
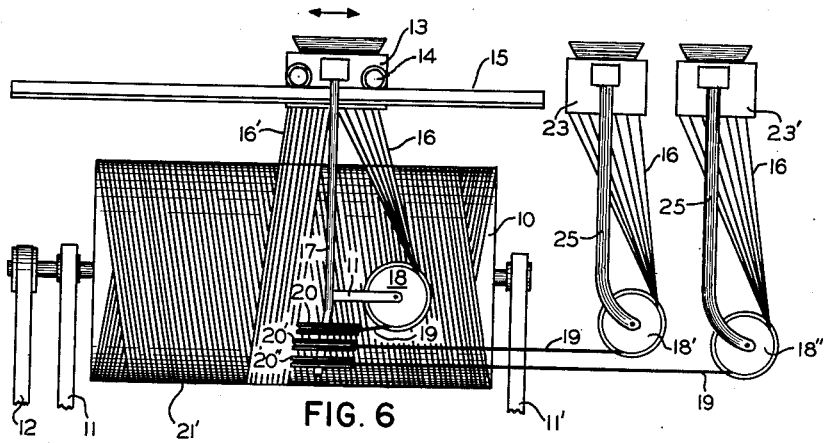
FIG. 6
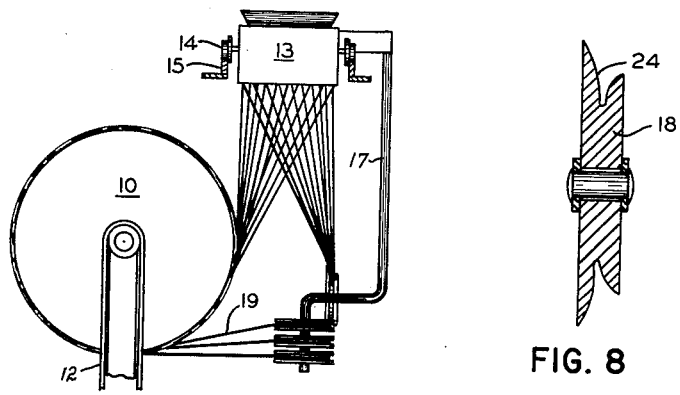
FIG. 7
FIG. 8
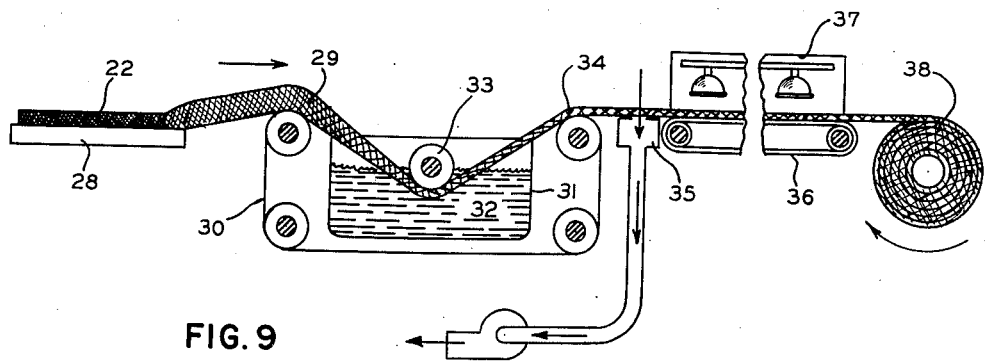
FIG. 9
INVENTOR.
ROBERT L. JACKSON JR.
BY
ATTORNEY

United States Patent Office 3,036,946
Patented May 29, 1962

3,036,946
DECORATIVE FILAMENTOUS MAT AND
METHOD OF MAKING SAME
Robert L. Jackson, Jr., Louisville, Ky., assignor to American Air Filter Company, Inc., Louisville, Ky., a corporation of Delaware
Filed Nov. 13, 1956, Ser. No. 621,907
4 Claims. (Cl. 156—167)

A conventional method for making filamentous flat mat material of glass fibers comprises the steps of: transversely reciprocating a glass filament feeder axially along and between the ends of a drum; rotating the drum a multiplicity of times during each traverse of the feeder; feeding a plurality of individual continuous filaments from the feeder to the drum during successive traverses to build up or wind a cylindrical condensed mat having a corresponding succession of layers, each containing a multiplicity of continuous helical turns of a single filament; slitting the cylindrical condensed mat axially to remove it from the drum and provide a planar condensed mat; stretching the condensed mat axially to provide an elongate web; applying a binder to and compressing the thickness of the elongate web to provide an elongate flat web; and treating the flat web to set the binder and form the finished flat mat material.

The conventional filamentous flat mat made in accordance with this method possesses substantial strength and presents an appearance characterized by a plurality of uniformly distributed individual or single filaments, some of which extend substantially straight through the mat in one general direction, others of which extend substantially straight through the mat in another general direction and still others of which appear as crinkled, curled or undulated in all directions and fill the spaces between the straight filaments.

These conventional filamentous flat mats are used to reinforce plastic sheet material and are integrally bonded with the plastic sheet material to provide a composite sheet material. The composite plastic sheet, thus made, is satisfactory for some uses or applications, but it has been found that other uses require a composite plastic sheet possessing still greater strength. A composite plastic sheet utilizing this conventional filamentous flat mat material and possessing light transmitting qualities presents an appearance of uniformly distributed individual filaments which, although pleasing, is not regarded as being distinctively decorative or ornamental.

The principal object of this invention is to produce an improved filamentous flat mat possessing increased strength, as compared to the conventional filamentous flat mat, and presenting a distinctly decorative appearance, i.e., a filamentous mat which, when integrally bonded within a composite plastic sheet material having light transmitting qualities, will provide the composite plastic sheet material with a distinctly decorative appearance.

Other important objects of this invention are to provide: a filamentous flat mat possessing increased strength while presenting the uniformly distributed individual fiber appearance of a previous conventional filamentous flat mat; a filamentous mat having a distinctively decorative appearance on one face and a uniformly distributed individual fiber appearance on the opposite face; and a method and apparatus for making the improved filamentous flat mat.

My method of making the improved filamentous flat mat briefly comprises varying the conventional method by directing a plurality of individual filaments into a single relatively thicker or heavier collected cord and feeding the glass fiber cord from a drum traversing device to the drum, during successive traverses, to build up a succession of layers of a cylindrical condensed mat, each successive layer containing a multiplicity of helical turns of glass fiber cord extending continuously through a central area of said drum from one end reversal area to the other. After the condensed mat is of the desired thickness, it is slit axially, removed from the drum, axially stretched, and otherwise processed in accordance with the conventional method.

Condensed mats can be made in accordance with my method by winding all of the layers of a condensed mat from glass fiber cords or winding some of the layers primarily or entirely from cords and others primarily or entirely from individually separate filaments. In other words, I may wind some of the layers from both cords and individually separate filaments. Condensed mats made by these varied methods will produce correspondingly varied patterns.

The invention is illustrated in the accompanying drawings wherein:

FIG. 1 is a perspective view of an improved flat mat;

FIG. 2 is a perspective view of a combination flat mat presenting a decorative appearance on its lower face and a uniformly distributed individual filament appearance on its upper face;

FIG. 3 is a perspective view of the combination flat mat of FIG. 2 with its faces reversed;

FIG. 4 is a diagrammatic front elevational view of a winding apparatus shown winding a cylindrical condensed mat in accordance with my improved method;

FIG. 5 is an end elevational view of FIG. 4;

FIG. 6 is a diagrammatic front elevational view of the winding apparatus of FIG. 4 winding a condensed mat in accordance with another embodiment of my improved method;

FIG. 7 is an end elevational view of FIG. 6;

FIG. 8 is a section taken on lines 8—8 of FIG. 4; and

FIG. 9 is a diagrammatic side elevational view of an apparatus for stretching a condensed mat to form an elongated web, for applying a binder to and flattening the elongated web, and for treating the elongated web to set the binder.

The decorative mat material 1, produced by my method, is illustrated in FIG. 1 and includes a series of overlying layers of glass filaments collected into cords. Some of the cords of each layer extend generally straight in one direction, continuously from one marginal edge of the mat to another marginal edge, while other cords of that layer are crinkled and curled and project into adjacent layers of the mat. The straight cords of alternate layers extend in one general direction while the straight cords of interposed layers extend in another general direction and cross the straight cords of the alternate layers.

Thus, the mat 1 is characterized by three distinctive groups of collected filament cords, one group of spaced cords 2 extending generally straight in one direction, another group of spaced cords 3 extending generally straight in another direction and crossing the first group, and a third group of cords 4 which are curled or undulated and extend through the mat in many directions. The flat mat material 1 may also include a plurality of fine individual separated filaments 5 filling the spaces between the large collected filament cords.

The flat mat 1 possesses increased strength over a conventional flat mat comprising only individual separated filaments and provides an ornamental or decorative appearance. This decorative appearance is characterized by the collected filament cords 2, 3 and 4 which are more prominent and thus form the basic portions or foreground of the decorative pattern while the individual separated filaments 5 extending through the open spaces between the collected filament cords are less prominent and form the background of the decorative pattern.

A modified flat material 6, called "combination flat mat," is illustrated in FIGS. 2 and 3. The combination flat mat 6 comprises a pair of plies 7 and 8 integrally formed together. The ply 7 presents, on its face, the appearance of a conventional flat mat containing only individual separated glass filaments and the opposite ply 8 presents, on its face, an appearance similar to the mat 1 of FIG. 1. The conventional flat mat ply 7 of the combination mat 6 contains a plurality of layers with each layer containing only individual separated filaments. The decorative ply 8 contains plural layers with each layer containing collected filament cords.

The ply 7 is preferably made dense enough so that the decorative ply 8 of the mat will not appear looking through the ply 7. The combination mat 6 is used where the uniform appearance of the conventional mat is desired, on at least one face, while the increased strength of the improved decorativ flat mat 1 is required.

A combination flat mat presenting the uniform appearance of a conventional flat mat on both faces will contain two outer plies of conventional flat mat material sandwiching an intermediate ply of improved flat mat material, with all the plies being integrally formed together.

The improved flat mat is produced by the steps of: winding a cylindrical condensed filamentous mat, containing collected cords of glass filaments, on a suitable apparatus; after the cylindrical condensed mat is of the desired thickness, slitting it axially between its ends to provide a planar condensed mat; stretching the condensed mat axially to provide an elongated and expanded thickness web; compressing or flattening the elongated and expanded web to provide an elongated and compressed or flat web; and applying a binder to the elongated flat web and treating it to set or harden the binder thereby providing the improved flat mat material in its finished or completed form.

FIG. 4 illustrates a conventional apparatus for winding a condensed filamentous mat which includes: a drum 10 having opposite shafts journaled for rotation in bearing supports 11 and 11'; a drum driving means comprising a belt 12 driven by a suitable power source (not shown) and driving a pulley keyed to a shaft of the drum; a glass furnace 13 supported for reciprocation along, above and between the ends of the drum and including rollers 14 riding on spaced rails 15; a suitable drive means (not shown) for driving the furnace 13 in its drum traversing movement; and a group of spinnerets (not shown) on the bottom of the furnace 13 for feeding a corresponding number of individual glass filaments 16 to the drum. This apparatus is disclosed in my copending application, Serial No. 329,821, filed January 6, 1953, now United States Patent No. 2,798,531.

In order to practice my improved method, this conventional apparatus additionally includes a bracket arm 17 vertically depending from the furnace 13 and traversing with the furnace 13. The lower end of the bracket 17 carries a horizontal extension which rotatably supports, at its free end, a vertical filament collector wheel 18. The wheel 18 receives a plurality of the individual filaments 16 from the furnace 13 and collects them into a single collected filament cord 19.

A horizontal discharge pulley 20 is rotatably mounted on the lower end of the bracket arm 17 and is aligned with the collector wheel 18 and the periphery of the drum 10 so that the cord 19 travels smoothly from the collector wheel 18 to pulley 20 which receives it and discharges it tangentially to the periphery of the drum 10.

FIG. 8 illustrates a section of a vertical collector wheel 18 for receiving the individual filaments and collecting them into a collected filament cord 19. The wheel 18 has a peripheral groove 24 which, in section, has a semicircular bottom connected to substantially vertical and parallel sidewalls which in turn terminate in outwardly flaring peripheral walls. The wall surface of the groove 24 must be smooth and free of imperfections. In operation the individual filaments move over the flaring peripheral walls and are collected in the rounded bottom of the groove 24. The side walls of the groove must be spaced far enough apart so that the collected filaments are not squeezed together tightly, causing filament breakage. If a filament does break, it will be wound on the wheel 18 and interfere with the remaining filaments causing them to break too.

It should be noted that the filaments 16 are completely dry when being collected by wheel 18 to form the cord 19. In other words, it is not necessary to apply a lubricating coating to the filaments prior to collecting them together.

My improved method is practiced on the foregoing apparatus by: reciprocating the furnace 13 and the corresponding bracket arm 17, collector wheel 18, and discharge pulley 20, while rotating the drum 10 a multiplicity of times during each traverse of the furnace 13; feeding the filaments 16 to the collector wheel 18 which collects them into a single collected cord 19; and feeding the cord 19 to the discharge pulley 20 which in turn discharges the collected cord 19 onto the periphery of the rotating drum 10, the rotating drum 10 providing all the power for continuously pulling the individual filaments 16 from the furnace 13 into a collected cord 19 on the wheel 18 and around the pulley 20, to build up a cylindrical condensed mat 21, during successive traverses of the furnace 13, having a corresponding succession of layers, each layer containing a plurality of helical turns of collected filament cords extending continuously through the central area of the drum between its opposite ends; and after the cylindrical condensed mat 21 is of the desired thickness, slitting it axially between the ends of the drum to remove it therefrom and to thereby provide a planar condensed mat 22.

It is preferable to vary the traversing speed of the furnace 13 in a cyclically repetitive pattern between maximum and minimum values, one or more times, during each traverse, as disclosed in my United States Patent No. 2,798,531.

In practicing the foregoing winding method, it is preferable to simultaneously wind a plurality of collected filament cords 19 on the drum 10. In order to do this by the apparatus of FIG. 4, one or more (two shown) additional furnaces 23, 23' are stationarily mounted beyond an end of the drum 10. Each furnace 23, 23' has a vertically depending bracket arm 25 rotatably supporting a vertical collector wheel 18', 18".

As seen in FIG. 4, the axis of the collector wheel 18' for the furnace 23 closest to the drum 10 is vertically offset slightly below the axis of the collector wheel 18 for the furnace 13. The axis of the wheel 18" for the next furnace 23' is vertically offset below the axis of the wheel 18' for the first furnace 23 and the wheels for additional furnaces will be offset in a similar manner.

Additional discharge pulleys 20', 20" are rotatably journaled on the bracket 17, each pulley being aligned with and cooperating with a particular collector wheel to receive its particular collected filament cord 19 and to discharge it to the drum 10. Each pulley 20, 20', 20" is horizontally offset on the bracket 17, so that each cord 19 will be slightly offset from the other cords 19 as they are delivered tangentially to the drum 10.

In a condensed mat using the additional furnaces 23, 23', a plurality of individual filaments 16 are fed from the spinnerets of each furnace 23, 23' to its cooperating collector wheel 18', 18", where they are collected into a single filament cord 19. The cord 19 is then fed from its collector wheel 18', 18" to its cooperating discharge pulley 20', 20" which receives the cord 19 and discharges it onto the periphery of the drum 10. FIG. 4 illustrates feeding these cords 19 simultaneously to the drum 10.

After the cylindrical condensed mat 21 is removed from the drum to form a planar condensed mat 22, it is further processed by stretching or elongating it axially to form an elongate and expanded thickness web, compressed in thickness to form an elongate flat web, treated with a binder, treated to remove the excess binder, and then treated to set the binder and form a web of finished filamentous flat mat material.

FIG. 9 illustrates these steps of finishing the flat mat material. The planar condensed mat 22 is shown supported on a table 28 and is being axially stretched to form an elongate expanded thickness web 29. The expanded web 29 is received on the endless conveyor 30 mounted on suitable rollers, which conveys it downwardly into a receptacle 31 of binder liquid 32. A flattening roller 33 is spaced above the conveyor 30 and compresses the expanded web 29 as the web moves through the binder liquid 32 to form an elongate flat web 34. As the elongate flat web 34 leaves the conveyor 30, it passes over a suction slot device 35 where excess binder liquid is removed. The flat web 34 then is received by a second conveyor 36 which carries it through a heat treating box 37 to set (harden) the binder. After the binder is set, the web of finished flat mat material is then wound into a suitable roll 38 for later use.

If a flat mat is desired having layers containing both collected filament cords and individual separated filaments, the corresponding condensed mat will be formed by winding its layers, simultaneously, from both collected filament cords and individual separated filaments.

FIGS. 6 and 7 illustrate winding a cylindrical condensed mat in this manner on the apparatus of FIGS. 4 and 5. Instead of feeding all of the filaments 16 from the furnace 13 to its collector wheel 18, only a portion of the filaments 16 are fed to the collector wheel 18, for collection into a filament cord 19, and the remaining filaments 16' are fed directly to the periphery of the drum 10. Thus, several collected filament cords 19 are laid on the drum 10 at the same time that a plurality of individual separated filaments 16' are laid on the drum. Each layer of the condensed mat 21', thus formed, will contain a multiplicity of continuous helical turns of each collected filament cord 19 and each individual separated filament 16'.

In making a combination flat mat, such as the mat 6 of FIGS. 2 and 3, containing two adjacent plies of different character, one ply containing only individual separated filaments and the other ply containing collected filament cords, the corresponding plies of the corresponding condensed mat are wound successively on the drum 10. Thus, the cylindrical condensed mat will contain two adjacent plies, one limited to individual separated filaments and the other containing collected filament cords. For winding the ply containing only individual filaments, the filaments 16 from the furnace 13 of FIGS. 4 and 5 will be removed from the collector wheel 18 and fed directly to the drum 10, while the feeding of the remaining cords 19 from the furnaces 23, 23' will be discontinued. After the cylindrical condensed mat, thus formed, is of the desired thickness, it is removed from the drum in the usual manner, by slitting it axially, and further processed as shown in FIG. 9.

A filamentous mat material of expanded thickness or "fluffed" character can be made by: winding the cylindrical condensed mat from both collected filament cords and individual filaments; applying the binder to the condensed mat as it is wound; removing the condensed mat and stretching it axially to provide an elongated and expanded thickness web; and treating the elongated and expanded thickness web to set the binder.

Having described my invention, I claim:

1. A method of making a condensed filamentous mat comprising transversely reciprocating a feeder axially back and forth along a drum, rotating the drum a multiplicity of times during each traverse of the feeder, feeding a plurality of individual filaments from said feeder to said drum during successive traverses of said feeder, feeding a collected cord of filaments to said drum in conjunction therewith to build up a cylindrical mat having a corresponding succession of layers, each layer containing a multiplicity of helical turns of a collected cord of filaments and a multiplicity of helical turns of individual filaments extending continuously through a central area from one end reversal area to the other and cutting said cylindrical mat to provide a planar mat.

2. The method as set forth in claim 1 including the step of varying the traverse speed of said feeder during successive reciprocations thereof.

3. A method of making a condensed filamentous mat comprising transversely reciprocating a feeder axially back and forth along a drum, rotating the drum a multiplicity of times during each traverse of the feeder, selectively feeding a collected cord formed of a plurality of discrete filaments simultaneous with the feeding of a plurality of discrete individual filaments from said feeder to said drum during a predetermined number of traverses to build up a first cylindrical mat portion having a corresponding number of layers each formed of a multiplicity of helical turns of a collected cord of filaments and a plurality of individual filaments extending continuously through a central area from one end reversal area to the other, selectively feeding said pluralities of discrete individual filaments from said feeder to said drum during a second predetermined number of successive traverses to build up a second cylindrical mat portion having a number of layers each formed of a multiplicity of helical turns of each individual filament extending continuously through the central area from one end reversal area to the other and cutting said cylindrical mat axially to provide a planar mat.

4. The method as set forth in claim 3 including the step of varying the traverse speed of said feeder during successive reciprocations thereof.

References Cited in the file of this patent

UNITED STATES PATENTS

| 2,546,230 | Modigliani | Mar. 27, 1951 |
|---|---|---|
| 2,644,780 | Simpkins | July 7, 1953 |
| 2,664,375 | Slayter | Dec. 29, 1953 |
| 2,731,066 | Hogendobler et al. | Jan. 17, 1956 |